United States Patent [19]

White et al.

[11] 3,806,707

[45] Apr. 23, 1974

[54] CREDIT CARD TERMINAL

[75] Inventors: James E. White, San Mateo; Quentin E. Correll, Belmont; Allan L. Swain, Palo Alto; Leo Robert Talbot, Santa Clara; Ernest E. Collado, San Carlos; Tommy A. Oudijk, Palo Alto, all of Calif.

[73] Assignee: Albert J. Day, San Mateo, Calif.

[22] Filed: Apr. 17, 1972

[21] Appl. No.: 244,614

Related U.S. Application Data

[62] Division of Ser. No. 88,861, Nov. 12, 1970.

[52] U.S. Cl... 235/61.11 C, 235/61.7 B, 340/149 A

[51] Int. Cl. .............................................. G06k 7/04

[58] Field of Search. 235/61.11 C, 61.7 B, 61.11 D, 235/61.11 E; 340/149 A, 146.3 D; 200/46

[56] References Cited

UNITED STATES PATENTS

| | | | |
|---|---|---|---|
| 1,815,996 | 7/1931 | Weaver | 340/146.3 Z X |
| 2,000,403 | 5/1935 | Maul | 340/146.3 Z X |
| 2,632,065 | 3/1953 | Smith et al. | 200/1 A |
| 2,723,308 | 11/1955 | Vroom | 340/146.3 Z X |
| 3,227,861 | 1/1966 | Schlieben | 340/146.3 Z X |
| 3,432,645 | 3/1969 | Hartmann | 235/61.11 C |
| 3,542,979 | 11/1970 | Collier | 235/61.11 C X |
| 3,573,369 | 4/1971 | Konig et al. | 340/365 L X |
| 3,596,249 | 7/1971 | Tierney | 340/146.3 Z X |
| 3,641,568 | 2/1972 | Brescia et al. | 340/365 L |
| 3,671,720 | 6/1972 | White et al. | 340/149 A X |
| 3,597,734 | 8/1971 | Harris | 340/149 A |
| 3,567,910 | 3/1971 | Sims | 235/61.11 D |
| 2,727,091 | 12/1955 | Zenner | 235/61.11 C |
| 3,184,714 | 5/1965 | Brown et al. | 340/149 A |
| 3,656,172 | 4/1972 | Wiltz | 340/149 A X |

OTHER PUBLICATIONS

IBM Tech. Discl. Bulletin, "Encoder", Harper et al., Vol. 10, No. 9, Feb. 1968, pp. 1374, 1375.

IBM Tech. Discl. Bulletin, "Electromagnetic Keyboard," Steckenrider, Vol. 12, No. 4, Sept., 1969, p. 612.

*Primary Examiner*—Thomas J. Sloyan

*Attorney, Agent, or Firm*—Naylor, Neal & Uilkema

[57] ABSTRACT

A credit card terminal for reading relatively standard credit cards. Reading is achieved through the employment of sensing pins arranged to read the account number or other special embossments embossed on the card. The pins are independently mounted in close groupings in a block and biased by individual vanes of a common leaf spring. Pin condition is sensed either through means of electrical contacts activated by the pins or electromagnetic sensors which change in condition responsive to the movement of the pins. In the preferred embodiment for the direct reading of embossed account numbers, the pins are grouped in groups of five on generally rectangular coordinates so as to achieve a discrete pin condition for each of the numbers zero to nine, inclusive.

The terminal also includes a verifying mechanism to sense the presence or absence of a light responsive verification area on the credit card and a voucher imprinting mechanism to imprint indicia embossed on the card onto a voucher. The principal element of the imprinting mechanism comprises a carriage to receive a card and voucher and maintain the embossments of the card in juxtaposition with the area of the voucher to be imprinted. The basic structure of the imprinting mechanism is completed by a roller positioned to be normally spaced from a voucher and card received within the carriage and a motion imparting mechanism adapted to selectively impart relative motion to the carriage and roller to force the roller into engagement with the voucher and roll the roller relative to the voucher in the area of the voucher to be imprinted. The verifying mechanism comprises a locking device associated with the motion imparting mechanism to normally maintain the mechanism in an inoperative condition and a photoelectric device to sense the presence or absence of a light responsive verification area on a card received in the carriage. Upon the sensing of a valid verification area, the photoelectric device operates in cooperation with the locking device to condition the motion imparting mechanism for operation.

3 Claims, 24 Drawing Figures

CREDIT CARD TERMINAL

This is a division of application Ser. No. 88,861, filed Nov. 12, 1970.

BACKGROUND OF THE INVENTION

The present invention relates to a system for reading out information encoded on cards, and more particularly, credit cards. In its more specific aspects the invention is concerned with a system wherein information encoded on a card by means of embossments and a discrete light responsive encoded area is read out by a machine for purposes of card verification authorization and/or data processing.

The most immediate background of the invention may be appreciated from a comparison of the present invention with the inventions disclosed in application Ser. No. 855,068, filed Aug. 4, 1969 by George S. Oberhardt and entitled Verification System; application Ser. No. 867,567, filed Oct. 20, 1969 by George S. Oberhardt and entitled Card Readout System; and, application Ser. No. 878,410, filed Nov. 20, 1969 by James E. White and George S. Oberhardt and entitled Encoded Card Readout System. These applications relate to both "offline" and "online" credit card verification systems. Offline systems, as herein used, refer to systems wherein verification is effected at the site of the verification terminal through some type of identification means, without transmittal of the information to a computer center. Typically this type of system requires that the card user produce some type of identification in addition to the card, such as a memorized code. One of the primary disadvantages of offline systems is that they are slow in taking into account changed conditions in the card user's credit status. Online systems, as herein used, refer to systems wherein the verification terminal transmits directly to a computer center or a remote concentrator which then forwards the information to a computer center. Transmission is generally effected over standard telephone lines and the computer transmits a response over the lines to the terminal indicating the status of the account and/or transaction. The present invention is concerned primarily with an online type of system.

In the prior art, encoded cards for use in verification and related systems are known. Cards have been encoded, for example, by means of such arrangements as the incorporation into the cards of components having predetermined resistance or capacitance characteristics. In addition, magnetically encoded cards have been utilized. These arrangements suffer from a number of deficiencies which render them undesirable for card verification purposes. Not the least of these deficiencies is the prohibitive expense of employing these relatively complex cards on a large scale. In addition, the readout mechanisms employed with such cards are relatively complex and prone to mechanical failure after extended use. Complex readout equipment of this nature does not readily lend itself to use by the small businessmen.

In addition to the electrical and mechanical verification systems of the type described above, the prior art also suggests electro-mechanical readout systems for use with embossed or perforated credit cards. Such prior art systems, however, have not had sufficient flexibility, nor have they been inexpensive enough to permit their use by smaller organizations. The readout mechanisms employed in these systems have been characterized by their complexity and susceptability to mechanical breakdown. The reliance in these systems on encoding by means of embossments or perforations only has had the additional disadvantage that it has provided no effective means whereby fraudulent or counterfeit cards may be readily detected.

SUMMARY OF THE INVENTION

The present invention is concerned primarily with a credit card terminal for use in an online system. Its incorporation into an online system may be substantially as disclosed in the aforementioned copending application Ser. No. 867,567. The terminal is considered completely unique in its construction. The features of particular interest are found in the contact pin arrangement used to sense the embossments in a card; the imprinter employed to imprint indicia embossed on cards onto a voucher; the layout of the pins to achieve direct reading of embossed numerals with a minimum of pins; the photoelectric counterfeit detection arrangement and the tie-in of this arrangement with an interlock provided to maintain the imprinter in an inoperative condition until such time as a valid card is detected.

DESCRIPTION OF DRAWINGS

The unique features of the present invention and their construction and mode of operation will be understood from the following detailed description taken in reference to the accompanying drawings, wherein.

DESCRIPTION OF THE ILLUSTRATED EMBODIMENT

Figure 1:
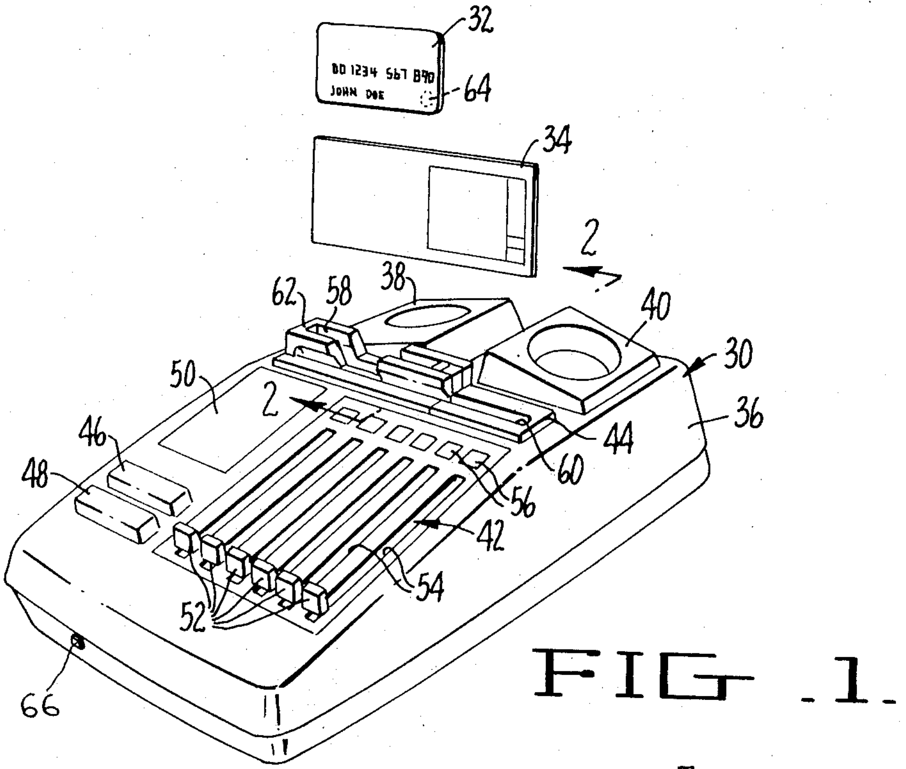
FIG. 1 is a perspective view illustrating the card terminal in its entirety and showing a voucher and credit card aligned with the receiving structure therefor in the terminal.

Referring now specifically to FIG. 1, the numeral 30 therein designates the card terminal in its entirety and the numerals 32 and 34 designate a credit card and voucher, respectively, aligned with the receiving slots therefor in the terminal. The basic elements of the terminal shown in FIG. 1 comprise: a case 36, telephone head phone receiving sockets 38 and 40; account entry panel 42; card and voucher carriage 44; "send" button 46; "print" button 48; and, signal panel 50.

The head phone receiving sockets 38 and 40 are for a relatively conventional acoustical/inductive coupler to provide for the transmission of signals from and receipt of signals by the terminal through a telephone head phone. While not illustrated, the terminal might also be provided with a direct connection Modem designed to be connected with a Bell System "Data Access Arrangement".

The account entry panel 42 comprises a plurality of slides 52 received in slots 54 and a numerical display window 56 associated with each of the respective slots and the slide received therein. While not illustrated, it is to be understood that the panel would be provided with numerical indicia thereon from 0 to 9 over the length of each of the slots and that each of the display windows would display a number corresponding to the number at which the slide associated therewith is positioned. In use, as will become more apparent from the subsequent discussion, the slides are positioned so as to enter the amount of the intended sale into the terminal and this amount is displayed in the windows.

The card and voucher carriage 44 is formed with a slot 58 for the receipt of a card and a slot 60 for the receipt of voucher. The central portion of the slot 58 is cut away to expose a card received therein so as to facilitate insertion and removal of the card. The slot 60 is so proportioned that a voucher received therein extends partially from the top of the slot to facilitate insertion and removal of the voucher. While not apparent from FIG. 1, it will later be seen that the entire carriage 44 is depressed into the case during normal operation of the terminal. To achieve this operation, the upwardly protruding boundary portion of the slot 58 is manually depressed. For convenient reference this boundary portion is designated 62.

At this point a brief description of the overall operation of the terminal is considered advisable. The detailed internal construction and operation of the various mechanisms will be developed in the subsequent discussion. Operation is commenced by first inserting a credit card and voucher into the respective slots 58 and 60, respectively. A credit card is inserted right side up, face forward, as shown in FIG. 1. In this position, a light responsive verification area 64 on the card faces rearwardly. The voucher is inserted right side up, face forward, in front of the credit card.

Once the card and voucher are so placed, the carriage is manually depressed downwardly and, assuming the card is inserted correctly and has the proper light responsive verification area thereon, the carriage will be locked in the down condition. If the card is not inserted correctly or is not provided with the proper light responsive verification area, the carriage will not lock and a card incorrect light on the signal panel 50 will light so long as the carriage is manually depressed.

If the card is inserted properly and of the correct type, the next step in the operation is to set the amount of the intended sale on the account entry panel. Once this is set, and the terminal has established a connection with the computer center, the send button 46 will light. The operator then presses the send button to cause the data in the machine to be transmitted to the computer center. This data comprises the identification data which is read directly off the card by the terminal and the dollar amount data which is entered into the account entry panel as well as the terminal or merchant identification data which is built into the terminal. While forming no part of the present application, it should be understood that this data would be serially transmitted to the computer center in generally the same way described in the aforementioned copending application Ser. No. 867,567.

After the data is transmitted to the computer center and processed, the center transmits back to the terminal to indicate approval or disapproval of the transaction. Assuming the transaction is approved, a light in the print button 48 is energized and at that point the button is depressed and the imprinter of the terminal is activated to imprint the embossed data on the card onto the voucher. In addition to the data off of the card, the imprinter also functions to imprint identifying data for the merchant onto the voucher. This identifying data is built directly into the terminal and, as will become more apparent from the subsequent discussion, employs embossments for imprinting in much the same way that the embossments on the cards imprint.

Once the imprinting operation is complete, the carriage 44 is released to extend to the extended condition illustrated in FIG. 1 and the card and voucher are removed. The details of the amount of the sale and the items involved are then entered on the voucher manually in conventional manner. While it is anticipated that a terminal might imprint the amounts directly on the voucher, this operation is not intended for the present terminal.

In the event the computer center does not approve the transaction, a warning light appears on the signal panel 50 and the print button is not conditioned for operation. Upon this occurrence, the carriage remains locked in the down position and the card will not return automatically. The operator may then tell the customer that his transaction has not been approved and that his card has been retained by the machine. The card may subsequently be removed through means of a manual release button 66 at the lower portion of the terminal.

In addition to the alternatives of approval and disapproval, the terminal may also be provided with a call center light to operate responsive to an appropriate signal received from the computer center. When this is activated, the operator should call the computer center to determine the problem. Generally it means that the card is valid, but that the customer's credit is not considered sufficient to cover the amount of the transaction requested. As yet another alternative, the computer center might signal the terminal to try operation again. Such a signal, as well as the call center light signal would appear in the signal panel 50.

Returning now to the detailed construction of the terminal illustrated herein, the first embodiment of the imprinter employed therein is illustrated in FIGS. 2 – 7, inclusive. This first embodiment is designated in its entirety by the numeral 68 and comprises, as its principal element, the carriage 44. The carriage 44 defines both the card receiving slot 58 and the voucher receiving slot 60. As may be seen from FIGS. 3 and 4, the carriage is made up of a main body member 70 having a lateral member 72 fixedly screwed thereto. The lateral member is provided to accommodate a relatively long voucher, as shown in phantom in FIG. 4 and designated by the numeral 34.

The main body member 70 is formed with a recess 74 for carrying a readout pin block assembly 76. The assembly 76 is fixedly fastened within the recess by any suitable means and its details of construction will be developed in the subsequent discussion. The assembly is positioned so as to be in direct juxtaposition to a card received within the slot 58. Readout pins 78 carried by the assembly are positioned to read the embossments of a card received within the slot 58. The block also provides a photoelectric sensing device 80 positioned to check for the presence or absence of the required light responsive area 64 on a card received within the slot 58. The photoelectric sensing device 80, as may be seen from FIG. 5, comprises a light emitting diode 82 and a photoelectric pick-up 84 received in a passage 86 formed in the assembly 76. The passage is of generally truncated conical configuration and partially bifurcated by a web 88. The diode 82 and photoelectric pick-up 84 are disposed, respectively, to opposite sides of the web. The end of the passage 86 opening through the assembly is disposed so as to register with the light responsive verification area 64 of a card received within the slot 58. In operation, the light emanating from the light emitting diode 82 reflects off of the area of the card in front of the passage 86 and is sensed by the photoelectric pick-up 84. The pick-up is ideally a photodiode or photo transistor. During operation, the diode 82 is activated upon depression of the carriage and the photoelectric pick-up operates a locking device to maintain the carriage in the depressed condition if the card within the carriage is properly positioned and contains the proper light responsive verification area. If the card is improperly positioned or does not contain such an area, the carriage is not locked down and a warning light is illuminated on the signal panel 50.

Immediately beneath the recess 74 the main body member 70 carries an embossed merchant identification plate 90. This plate, as will become more apparent from the subsequent discussion, is disposed so as to imprint the merchant's identification onto a voucher simultaneously with the imprinting of credit card indicia onto the voucher. The plate may best be seen from FIG. 7.

The main body member 70 also carries card supporting structure to position a card received in the slot 58 in a predetermined position relative to the pins 78 and passage 86. The principal elements of this structure comprise a pair of spring guides 92 of generally L-shaped configuration which extend down the slot 52 across the face of the block 76 and then back into passages 94 (See FIG. 7) extending in to the body member beneath the pin block assembly. The upper ends of the guides 92 diverge and extend slidably into passages 96 provided therefor in the main body member 70 (See FIG. 5). The lower ends of the guides 92 extend beneath the ends of a U-shaped card support member 98 having its legs 100 extending slidably through the passages 94. While the full U shape of the card support member cannot be seen from the drawings, its construction is apparent from FIG. 5. There one of the legs of the member is designated by the numeral 100 and the bight portion is shown in section and designated by the numeral 102. The bight portion extends transversely across the body member 70, as may be seen by the phantom line representation in FIG. 7. Channels 104 are formed in the lower surface of the legs 100 for receipt of the ends of the spring guides 92. A leaf spring 106 is fastened to the rear side of the body member 70 so as to have its distal end in biasing engagement with the bight portion 102 of the card support member 98 (See FIG. 5). Through the provision of the spring 106 the card support member 98 and the lower ends of the spring guides 90 are gently biased forwardly.

The card supporting and positioning structure also includes a leaf-type top guide spring 108. This spring is of generally L-shaped cross-section (See FIG. 5) and extends over the majority of the length of the pin block 76 (See FIG. 7). One end of the spring 108 is held in the main body member immediately over the pin block assembly 76 and the other end extends over the face of the assembly so as to gently bias a card outwardly therefrom. A cut-out 110 in the face of the assembly facilitates compression of the free end of the spring 106 into a position substantially flush with the face of the assembly.

The basic card supporting and positioning structure is completed by a spring biased guide block 112 received in the member 70 to one side of the slot 58 for slidable engagement with a card received within the slot. The support structure for the guide block 112 includes a guide pin 114 fixed relative to the block and extending slidably into a passage 116 therefor in the main body member 70 and a compression coil spring 118 interposed between the block 112 and the body member 70 to normally urge the block inwardly relative to the slot 58. While not illustrated, it should be understood that suitable stop shoulders limit slidable movement of the guide block 112 so that it may only extend slightly into the card receiving slot 58.

Figure 5:
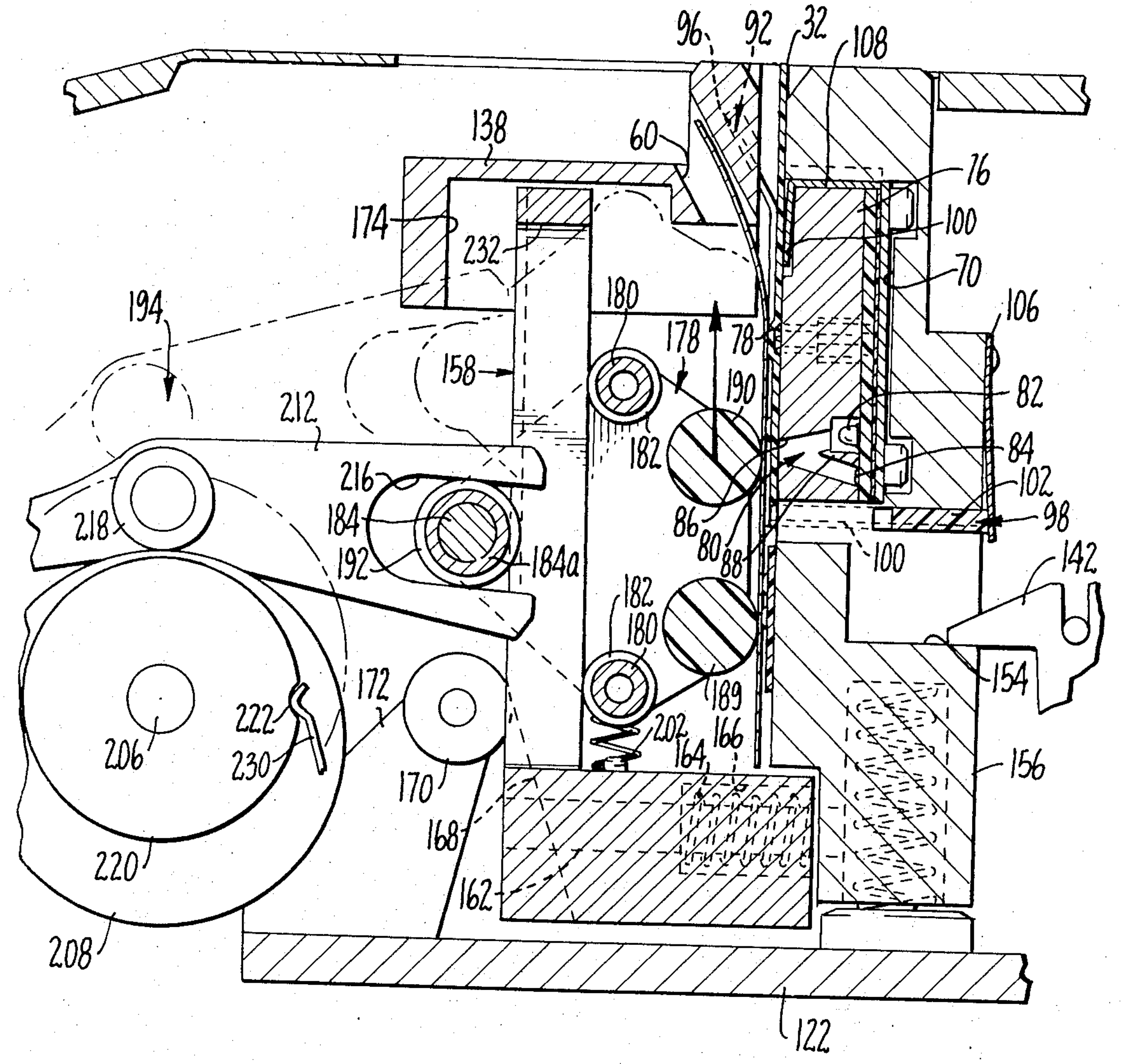
FIG. 5 is a cross-sectional view taken on the plane designated by line 5—5 of FIG. 4.
Figures 6, 7:
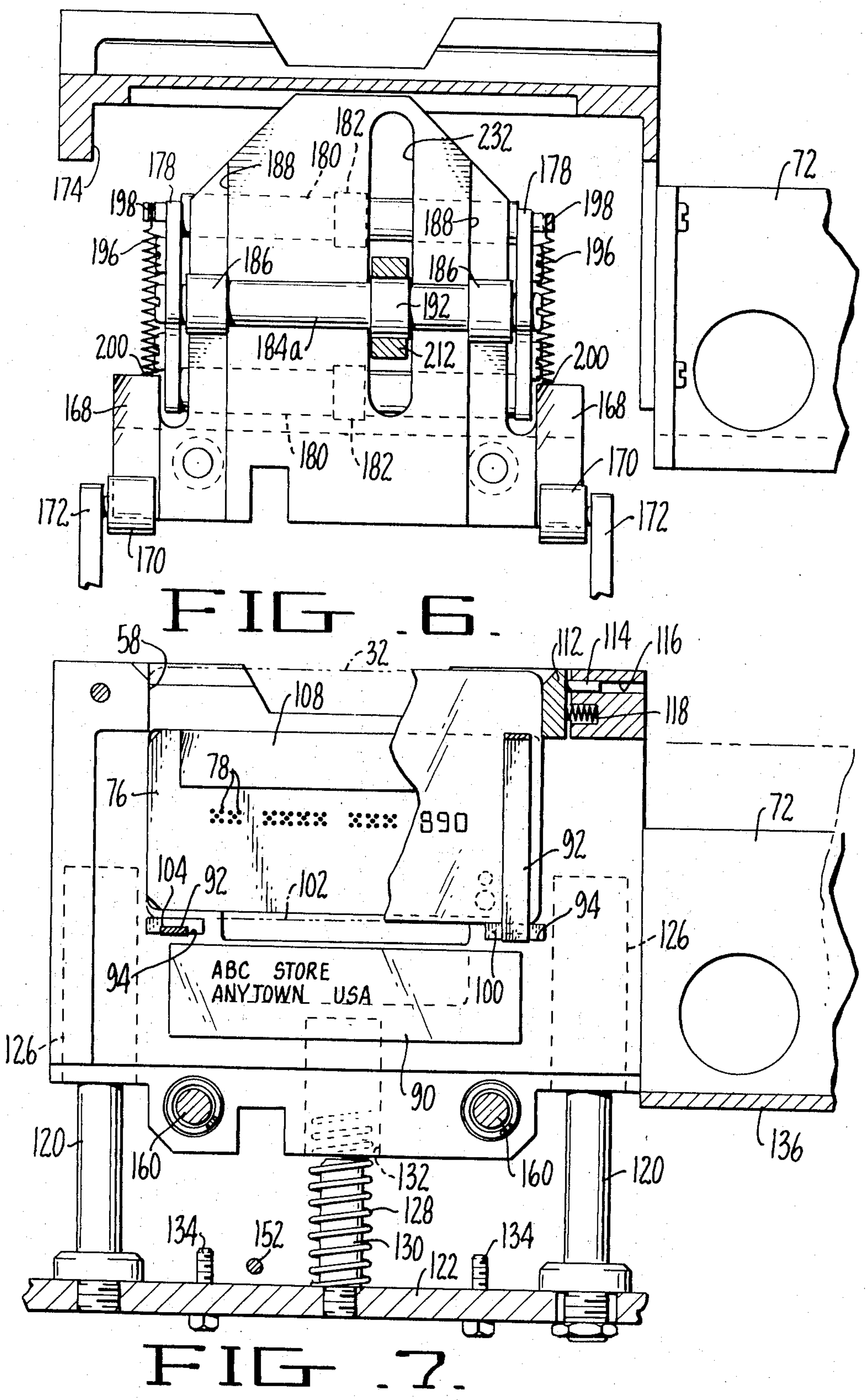
FIGS. 6 and 7 are cross-sectional views taken on the planes designated by lines 6—6 and 7—7, respectively, of FIG. 2.

The operation of the card supporting and positioning structure may best be appreciated from FIGS. 5 and 7 wherein a card 32 is shown positioned within the slot 58. As so positioned, the card is received between the guide springs 92 and the top guide spring 108 and supporting on the legs 100 of the card support member 98. The guide block 112 slidably engages one edge of the card so as to force the card against the side of the slot 58 opposite the guide block. Through this overall arrangement, the card is positioned horizontally and vertically, as viewed in FIG. 7, and transversely, as viewed in FIG. 5.

The carriage 44 is mounted for rectilinear vertical movement within the case 36 through means of vertically extending guide pins 120 fixed to and extending upwardly from a sub-frame 122 supported on bosses 124 inside of the case. The guide pins 120 extend slidably into sleeve bearings 126 mounted in the main body member 70 of the carriage and the right hand pin (as viewed in FIG. 7) floats to facilitate alignment. The carriage is resiliently biased upwardly to the extended condition by a compression coil spring 128 interposed between the sub-frame 122 and a central portion of the main body member 70. The spring 128 is maintained in position through means of a dowel 130 extending upwardly thereinto from the sub-frame 122 and a bore 132 formed for the receipt thereof in the under side of the member 70. Upward movement of the carriage relative to the case may be limited by any suitable stop means. Downward movement is limited by adjustable stop screws 134 supported on the sub-frame 122 so as to abut with the lower surface of the member 70 upon full depression of the carriage.

While the foregoing description of the carriage 44 has been directed primarily to the structure therein provided for the support of credit card, it should also be understood that the carriage provides for the receipt and support of a voucher. Positioning of the voucher is not nearly so critical as that of the credit card, however, since it is only necessary that the voucher be disposed so that the embossed indicia of the credit card and the merchant identification plate 90 may be imprinted thereon. The normal positioning of the voucher may be seen from FIG. 5. It is received within the slot 60 and supported on the bottom, designated 136 of the lateral member 72.

At this point it is noted that the main body member 70 is fabricated of two parts rigidly interconnected. This may be seen from FIG. 5 wherein the portion of the body member defining the recess for the pin block assembly has cross hatching in one direction and the portion of the body member defining the voucher slot 60 has cross hatching in another direction. The latter portion is designated by the numeral 138. It should be understood that these portions of the main body member are fixedly interconnected and that they move together as part of the carriage.

Figure 2:
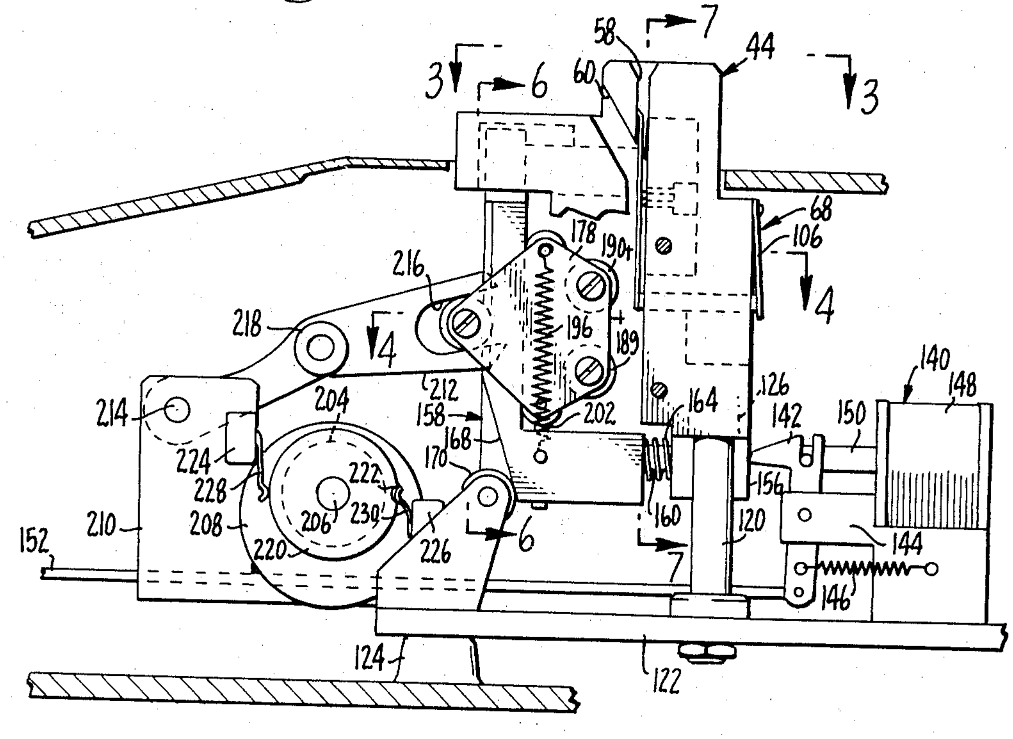
FIG. 2 is a cross-sectional view taken on the plane designated by line 2—2 of FIG. 1.
Figure 3:
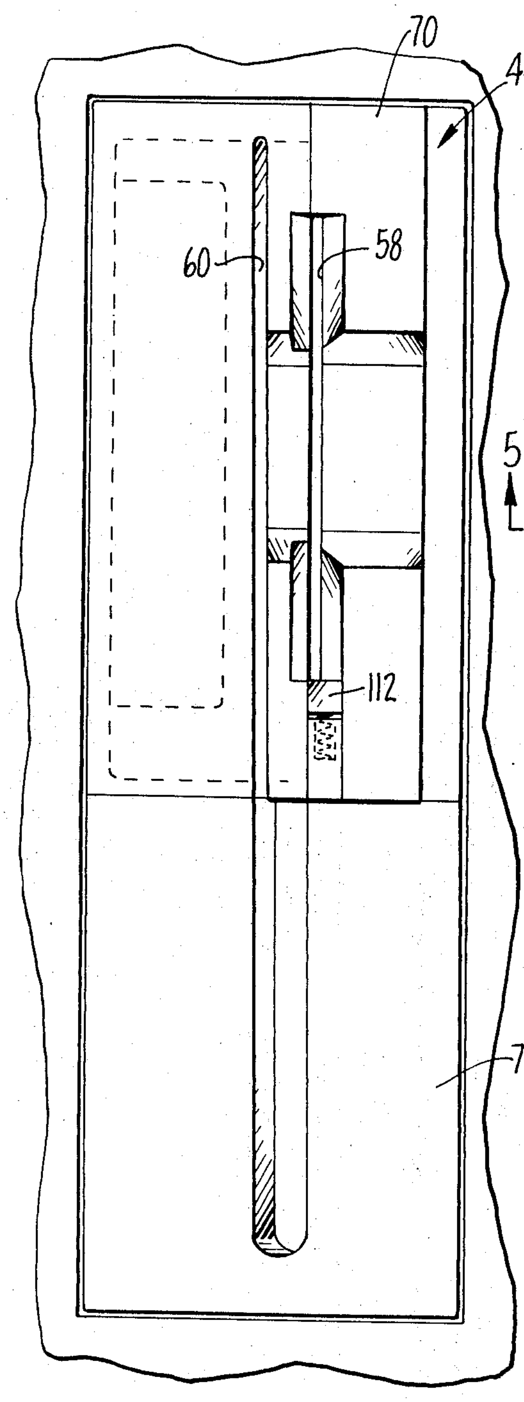
FIGS. 3 and 4 are cross-sectional views taken on the planes designated by lines 3—3 and 4—4, respectively, of FIG. 2.
Figure 4:
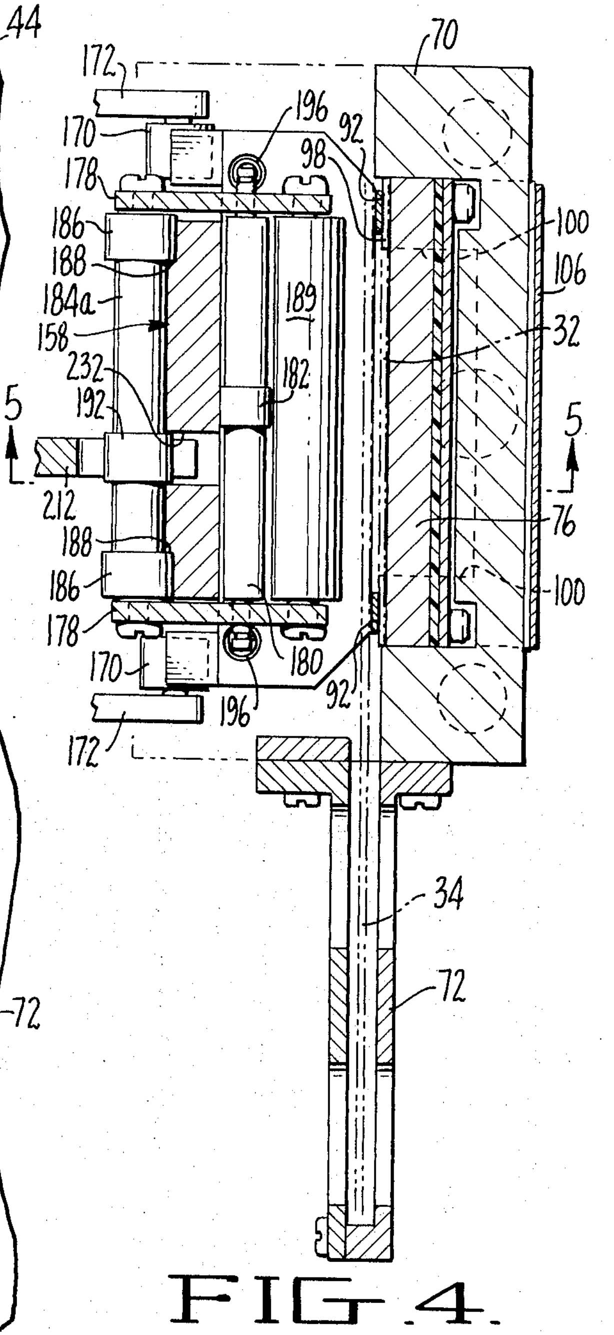

The mechanism to lock the carriage in the depressed position is designated in its entirety by the numeral 140 and may best be seen from FIG. 2. The principal element of this mechanism comprises a hook 142 fulcrumed on a support 144 mounted on the sub-frame 122. The hook is pivotal between a disengaged position as shown in FIG. 1 and an engaged locking position as shown in FIG. 5. A tension coil spring 146 secured between the lower end of the hook and the support 144 normally urges the hook towards the engaged position. A solenoid 148 is supported on the support 144 and has the operating shaft 150 thereof connected to the upper end of the hook so that activation of the solenoid functions to retract the hook to the disengaged position against the influence of the spring 146. As an additional override, a manual release rod 152 is secured to the lower end of the hook 142 and extends therefrom to the afore-described manual release button 66. Through the provision of the rod, the application of a pulling force to the button 66 functions to release the hook 142 against the influence of the spring 146.

The main body member 70 of the carriage is formed with a shoulder 154 disposed to be aligned with the hook 142 when the carriage is in the fully depressed position. The area of the member 70 beneath the should presents a smooth surface 156 over which the nose of the hook is adapted to ride. In operation, the hook normally rides over the surface 156 until the carriage is fully depressed. Upon reaching the latter condition, the spring 146 automatically urges the hook to the engaged position illustrated in FIG. 5 wherein it functions to lock the carriage in the depressed position. Assuming a card with a proper light responsive area is properly positioned within the card receiving slot of the carriage, the carriage will remain locked by the hook until the transaction is complete. If the card is improperly positioned or does not have the proper light responsive verification area thereon, the solenoid will actuate to retract the hook and release the carriage. Solenoid operation is triggered through means of circuitry cooperating with the photoelectric sensing device 80.

An intermediate support 158 is carried by the carriage 44 for up and down movement therewith and transverse movement relative thereto. The member 158 is of generally L-shaped cross-sectional configuration and is supported on the carriage 44 through means of dowels 160 fixed to and extending from the member 70 into slidable engagement with bearing bores 162 provided for the dowels in the support. Compression coil springs 164 are received around the dowels and interposed between the intermediate support 158 and the member 70 to normally urge the intermediate support away from the member. Enlarged bores 166 in the intermediate support 158 accommodate the employment of springs 164 a relatively great length.

The rear side of the intermediate support 150 is formed with cam surfaces 168 disposed for engagement with rollers 170 supported on the sub-frame 122 through means of arms 172. Through the interrelationship of the cam surfaces and the rollers, depression of the intermediate support along with the carriage functions to cam the intermediate support forwardly from the position shown in FIG. 1 to that shown in FIG. 5. A cut-out 174 formed in the lower side of the portion 138 accommodates this movement of the intermediate support relative to the carriage.

A roller support 176 is mounted on the upright portion of the intermediate support for up and down movement relative thereto. This support comprises: side plate 178 (See FIG. 6) disposed to either side of the upright portion of the support; a pair of center roller shafts 180 fixedly interconnecting the side plates, said shafts each carrying a roller 182 disposed for rolling engagement with the front surface of the support 156; a rear roller shaft 184 interconnecting the rear ends of the side plates, said shaft carrying a pair of rollers 186 disposed for rolling engagement with the rear side of the intermediate support and guiding engagement with shoulders 188 formed thereon; and, a pair of front imprinting rollers 190 rotatably supported between the side plates for rolling engagement with a voucher received in the slot 60 when the carriage is fully depressed, as seen in FIG. 5. In the latter condition, the rollers 190 also function to press a credit card received within the slot 58 against the pin block assembly 76.

From the cross-section of FIG. 5, it will be seen that the shaft 184 is surrounded by a pair of cylindrical spacers 184*a* having a roller 192 disposed therebetween. The spacers 184*a* function to maintain the rollers 186 and 192 in spaced position along the length of the shaft. As will become more apparent from the subsequent discussion, the roller 192 is provided for cooperation with an imprinter operating mechanism provided to impart up and down movement to the roller support 176 relative to the intermediate support 158. Such movement functions to traverse the imprinting rollers 190 over the embossments of the merchant identification plate 90 and the credit card received within the slot 58 to imprint the indicia of said embossments onto a voucher received within the slot 60.

The roller support 176 is normally biased downwardly relative to the intermediate support 158 through means of a pair of tension coil springs 196. These springs are attached to either side of the roller support between posts 198 extending outwardly from the upper center roller shaft 182 and anchorages 200 on the intermediate support. Adjustable stop screws 202 are mounted on the lower leg of the intermediate support for abutting engagement with the lower center roller shaft 180 to limit the extent of downward movement of the roller support relative to the intermediate support. This limiting operation may be seen from FIG. 2.

Turning now to the imprinter operating mechanism, this comprises: a motor 204 mounted on the sub-frame 122 and having a rotary output shaft 206 extending substantially parallel to the roller shafts of the roller support 176; an eccentric 208 mounted on the output shaft 206 for rotation therewith; an upright mount 210 fixed to and extending upwardly from the sub-frame 122; an arm 212 mounted on the upper end of the mount 210 for pivotal movement about a pin 214 having its axis extending substantially parallel to the roller shafts of the roller support, said arm having a bifurcation 216 in the distal end thereof straddling the roller 192 for rolling engagement therewith; a cam follower roller 218 mounted intermediate the ends of the arm 212 for rolling engagement with the eccentric 208; a circular switch plate 200 concentrically mounted on the shaft 206 for rotation therewith, said plate having a switch triggering notch 222 in the periphery thereof; and, a pair of switches 224 and 226 disposed to either side of the switch plate and having trigger followers 228 and 230, respectively, disposed for sliding engagement with the periphery of the plate and spaced 180 degrees apart relative to the periphery. As shown, the switches 224 and 226 are supported on the mount 210 and one of the arms 172, respectively.

In operation, the imprinter operating mechanism may only be operated when the print button 48 is lighted responsive to the signal of the central computer coupled to the terminal. This means that the credit card and transaction have been approved and that the carriage is locked in the depressed position illustrated in FIG. 5. Depression of the print button then functions to activate the motor 204 to rotate the eccentric through 180 degrees and lift the roller support upwardly as shown by the phantom line representation in FIG. 5. At the end of 180 degrees of motor rotation, the switch 224 functions through means of the notch 222 to stop the motor with the roller carriage in the elevated condition. At this point, imprinting is complete and the carriage is released through the circuitry of the terminal. Upon release of the carriage, the circuitry again energizes the motor 204 for rotation through another 180 degrees. Movement at the end of 180 degrees is terminated by operation of the switch 220 through means of the notch 222. Thus, at the end of imprinting the terminal is again returned to starting condition for taking on a new transaction.

It is here noted that the upwardly extending leg of the intermediate support is formed with a slot 232 to accommodate movement of the arm 212 relative thereto. This is necessary to accommodate both the imprinting operation and up and down movement of the carriage.

Figure 8:
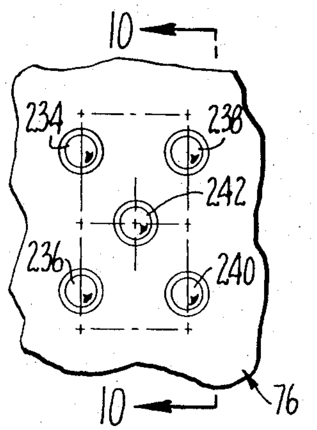
FIG. 8 is an enlarged fragmentary view showing the five pin sensing pin array employed for the direct reading of embossed arabic numerals.
Figure 9:
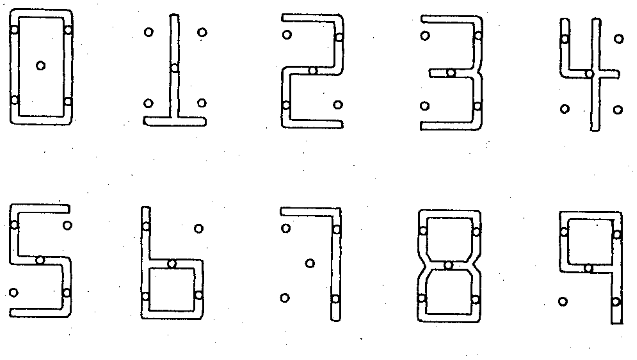
FIG. 9 is a diagrammatic view showing the arabic numerals 0 to 9, inclusive, in the form in which they are embossed and the manner in which they are aligned with the five pin sensing array.

Referring now to FIG. 8, there is shown the sensing pin array for directly reading arabic numerals embossed into a credit card. The numerals 0 to 9, inclusive, are illustrated in FIG. 9 wherein it can be seen that the numerals are laid out on rectangular coordinates defining an "H"-shaped configuration. As may be seen from both FIGS. 8 and 9, one set of sensing pins is provided for each numeral and each set comprises five pins arranged in an "H" pattern with one pin at the end of each leg of the "H" to either side of the cross member of the "H" and one pin substantially at the mid-point of the cross member. The pins are designated by the numerals 234, 236, 238, 240, and 242, respectively. Through the unique five-pin layout, each of the numerals 0 to 9, respectively, results in an unique pin readout. This may be seen from FIG. 9 wherein the pins are shown in the position which they assume with respect to each of the respective numerals.

Figure 10:
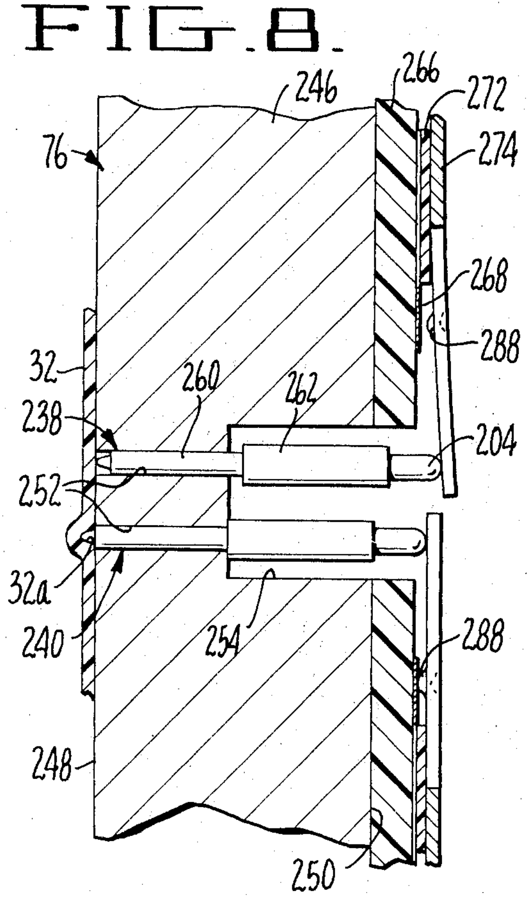
FIG. 10 is a cross-sectional view taken on the plane designated by line 10—10 of FIG. 8, with a fragmentary section of a credit card shown disposed over the reading ends of the pins.

FIG. 10 shows the construction of the pin block assembly, designated 76, and illustrates a pair of the pins 238 and 240 in the process of reading a numerical embossment on a credit card, designated 32. An embossment in the credit card is designated by the numeral 32a. The principal component of the assembly shown in FIG. 10 comprises a pin block 246. The pin block 246 is formed with an outer surface 248; an inner surface 250; passages 252 for slidable receipt of the pins; and, a cutout 254 extending across the rear of the passages 252. The outer surface 248 of the pin block 246 is flat and adapted to assume juxtaposed relationship with the flat back surface of a credit card. The block is so positioned that when a card is received within the slot 58 of the terminal 30, each numeral embossed in the card alignes with a set of one of the five pin arrays.

Figure 12:
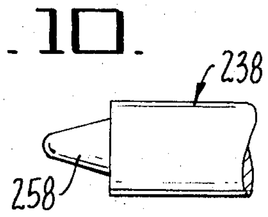
FIG. 12 is an enlarged fragmentary view showing the card engaging end of one of the sensing pins.

The sensing pins are identical in construction and for simplicity of description only the pin 238 illustrated in FIG. 10 will be described in detail. The pin is of integral construction and comprises: a generally conical nose 258 formed with a crowned distal end (See FIG. 12); a cylindrical body 260 slidably received within the passage 252; an elongated stop collar 262 disposed for abutting engagement with the inner wall of the cutout 254 so as to limit outward movement of the pin relative to the block; and, a crowned rearward end 264. The body 260 and collar 262 are so positioned and proportioned relative to each other so that only the nose 258 extends from the surface 248 when the pin is fully extended. The nose 258 is proportioned for receipt in the embossment in a credit card so that when aligned with an embossment the pin may extend to its outermost position.

The pin block assembly 76 also includes a printed circuit board 266 fastened in juxtaposition to the surface 250. The board is fabricated of an electrically nonconductive material and thus functions to insulate the pin block 246 from the elements to the outside of the board. Printed circuitry 268 is disposed on the outside of the board and cutout 270 is formed generally centrally of the board in alignment with the cutout 254 of the block 246. As will become more apparent from the subsequent discussion, a discrete area of the printed circuitry 268 is associated with each of the sensing pins.

The pin block assembly 76 is completed by an electrically nonconductive insulator sheet 272 disposed in juxtaposition to the board 266 and a vane-type leaf spring 274 secured over the sheet. The board 266, sheet 272 and spring 274 are fastened to the block 246 by screws 276 (See FIGS. 4 and 5). These screws are intended solely for fastening purposes and are so disposed as not to make contact with the circuitry 268.

The leaf spring 274 is of one-piece construction and cut so as to have an individual vane disposed in biasing contact with each of the sensing pins so that each pin is individually biased to normally extended condition. The vanes are arranged in groups of five so that the ends thereof are disposed in a generally H-shaped pattern corresponding to the pattern in which the pins cooperating therewith are disposed. The overall arrangement of the vanes can best be seen from FIG. 11. From this figure it can be seen that each set of five pins 234, 236, 238, 240 and 242, respectively, is biased by a corresponding set of vanes 278, 280, 282, 284 and 286. The vanes 278 and 280 extend from opposite sides of the spring and are generally axially aligned with the ends thereof spaced apart. The vanes 282 and 284 also extend from opposite sides of the spring in axial alignment with the ends thereof spaced apart. The vane 286 extends from one side of the spring between either the vanes 278 and 282 or 280 and 284. Ideally, the successive vanes 286 extend from opposite sides of the spring as shown in FIG. 11.

Figure 11:
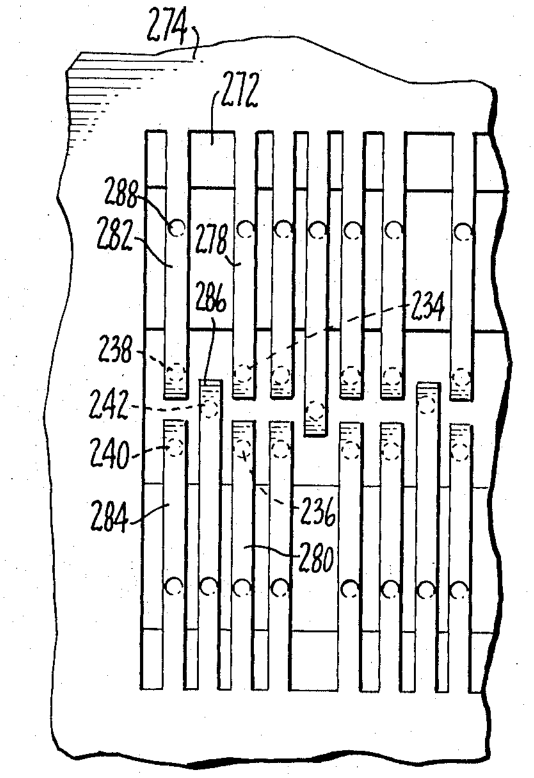
FIG. 11 is a fragmentary back view of the sensing pin arrays of FIG. 10 showing the vane type leaf spring employed to bias the sensing pins outwardly into engagement with a credit card.

In the embodiment shown in FIGS. 10 and 11 the spring 274 forms a portion of the circuitry in the terminal and each of the vanes is formed with a contact 288 disposed to be in contact with a discrete area of the printed circuitry 268 when the pin associated with the vane is fully extended. Thus, when a sensing pin is aligned with an embossment in a credit card, the vane associated with the pin completes a discrete circuit through the printed circuitry 268. Conversely, when a pin is depressed by the flat surface of a credit card, the vane associated with the pin interrupts a discrete circuit of the printed circuitry 268. These two conditions can be seen from the lower and upper pins, respectively, in FIG. 10. It is through this making and breaking of discrete circuits that the embodiment of FIGS. 10 and 11 affects the direct reading of embossed numerals in a credit card.

Figure 11A:
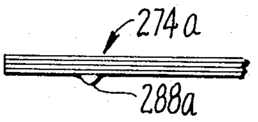
FIG. 11A is a fragmentary cross-sectional elevational view of an alternative construction for the vane type leaf spring.

FIG. 11A shows an arrangement wherein the spring, designated 274*a*, is laminated. This facilitates fabrication of the spring out of thin material which may be cut by etching. Ideally the laminations are not adhered together and only the lowermost laminate is formed with a contact dimple 288*a*. In plan configuration th spring 274*a* would correspond to the spring 274.

Figure 13:
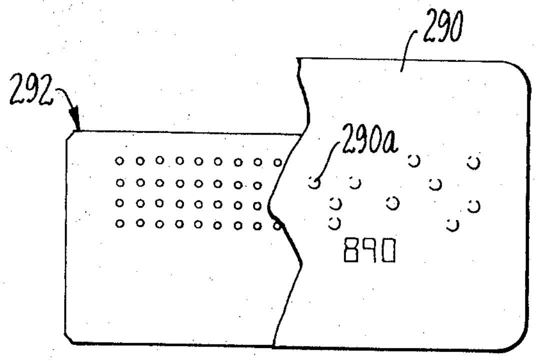
FIG. 13 is a fragmentary plan view of a credit card having encoded embossments impressed therein and showing a pin block and the sensing pin arry employed for the reading of such embossments.

Referring now to FIG. 13, therein is illustrated a credit card 290 embossed with special dimple-like embossments 290*a* in addition to the numerical embossments. These dimple-like embossments are of similar to those disclosed in aforementioned copending application Ser. Nos. 867,567 and 878,410 and each vertical line of dimples on the card corresponds to a particular number. Any suitable binary code might be employed, such as the four bit binary code suggested in application Ser. No. 867,567.

FIG. 13 also discloses a pin block assembly 292 suitable for employment with the dimple-like embossments of the card 290. In this block, the pins are arranged in rows of four so as to align with the vertical rows of dimple-like embossments in the card. The block 292 is proportioned so that it may be inserted in the terminal 30 in place of the pin block assembly 76. Thus, the terminal may be facilitated either for the direct reading of embossed numerals or for the reading of dimple-like embossments by simply changing the pin block assembly and the circuitry employed therewith.

The employment of the dimple-like embossments shown in FIG. 13 has the advantage that the embossments may be relatively large and, thus, tolerances of embossment placement on the card and card positioning within the terminal may be liberalized. It also has the advantage that the size and spacing of the structure in the pin block assembly may be increased.

Figure 14:
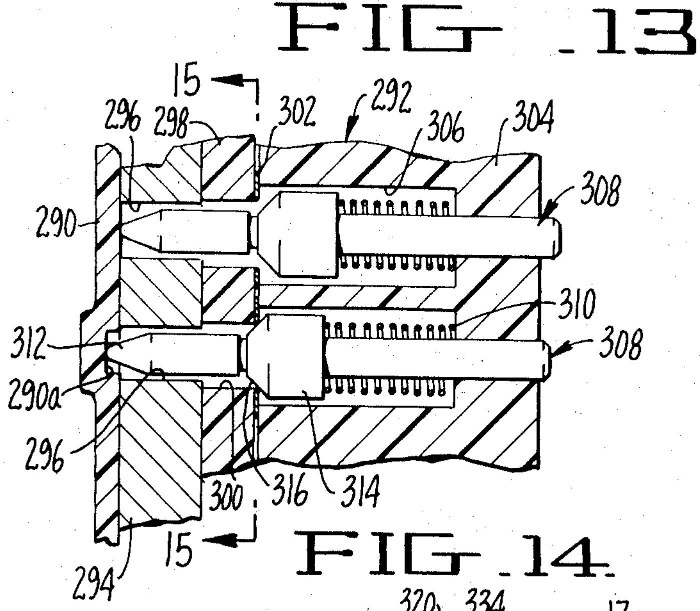
FIG. 14 is a fragmentary cross-sectional view showing the pin construction employed in the pin block of FIG. 13.
Figure 15:
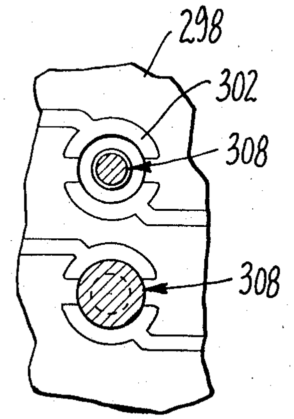
FIG. 15 is a fragmentary cross-sectional view taken on the plane designated by line 15—15 of FIG. 14.

FIGS. 14 and 15 illustrate a preferred embodiment of the pin block assembly 292 and the card 290 designed for use therewith. As there shown, the assembly comprises: a pin block 294 having passages 296 extending therethrough in the pattern shown in FIG. 13; a printed circuit board 298 juxtaposed to one side of the block 294, said board being fabricated of an electrically nonconductive material and having passages 300 extending therethrough in alignment with the passages 296; printed circuitry 302 formed on the board 298 and having discrete circuits thereon interrupted by the passages 300 (See FIG. 15); a spring block 304 juxtaposed to one side of the printed circuitry 302, said block being fabricated of electrically nonconductive material and having passages 306 extending therethrough in alignment with the passages 296; a sensing pin 308 slidably received within each of the respective passages 296 and the passages aligned therewith; and, a compression coil spring 310 received around each of the pins 308 within the passage 306 to normally bias the pin outwardly relative to the pin block 294. Each pin is formed with a generally conical crowned nose 312 adapted to extend into the embossments 290a. Rearwardly of the nose 312 each pin is formed with an electrically conductive collar 314 having a tapered surfce 316 adapted to engage the portions of the circuitry 302 interrupted by the passages associated with the pin. The collar 314 also provides an abutment against which the spring 310 seats.

The operation of the pin block assembly 292 may be appreciated from FIGS. 14 and 15. As there shown, the upper pin 308 is shown in a depressed condition wherein it interrupts the discrete circuit associated therewith. This results because depression of the pin functions to force the surface 316 out of contact with the printed circuitry interrupted by the passage in the board through which the pin extends. The lower pin in FIGS. 14 and 15 is shown extended into an embossment 298. In this condition the spring 310 associated with the pin forces the surface 316 thereof into engagement with the discrete portion of the circuitry interrupted by the passage through which the pin extends. Thus, this portion of the circuit is completed.

Figure 16:
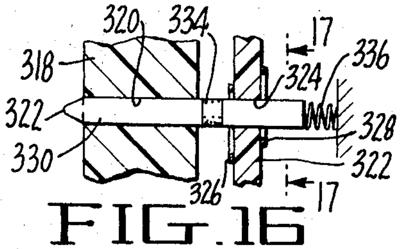
FIG. 16 is a fragmentary cross-sectional view diagrammatically illustrating a first embodiment of electro-magnetic sensing pin arrangement suitable for employment in the card terminal of the present invention.
Figure 17:
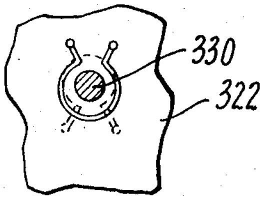
FIG. 17 is a cross-sectional view taken on the plane designated by line 17—17 of FIG. 16.

FIGS. 16 and 17 diagrammatically illustrate an alternative sensing pin arrangement which might be used in either the direct reading of embossed numerals or the reading of coded dimple-like embossments (e.g., FIG. 13). This arrangement comprises: a pin block 318 having a passage 320 extending therethrough; a printed circuit board 322 having a passage 324 extending therethrough in alignment with the passage 320; a pair of one turn electrical coils 326 and 328, respectively, formed on opposite sides of the board 322 in concentric relationship to the passage 324; a sensing pin 330 extending slidably through the passages 320 and 324, said pin being fabricated of a non-magnetic material and having a crowned nose similar to the afore-described nose 258; a discrete magnetic area 334 carried by the pin 330 for movement into and out of the influence of the coils 326 and 328; and, a spring 336 disposed to normally urge the pin outwardly relative to the pin block 318 so as to displace the magnetic area 334 from the influence of the coils 326 and 328. While not illustrated, it should be understood that suitable stop means would be provided to limit the degree to which the spring 336 can extend the pin 330 relative to the pin block. Ideally this limiting means would limit movement outwardly relative to the block to approximately the position shown in FIG. 16.

In operation, the pin 330 moves between extended and retracted positions in a manner corresponding to the movement of the pins described with reference to FIG. 10. When the pin is extended responsive to the sensing of an embossment, the magnetic area 334 is removed from the influence of the coils 326 and 328. When compressed responsive to the sensing of a flat area on a card, the magnetic area 334 is moved into the influence of the coils 326 and 328 and, thus, causes a change in both the inductance and reluctance of the circuitry associated with these coils. It is through this change in condition that reading is affected.

Figure 18:
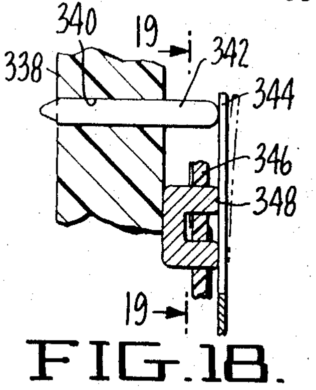
FIG. 18 is a fragmentary cross-sectional view diagrammatically illustrating a second embodiment of an electro-magnetic sensing pin arrangement suitable for employment in the card terminal of the present invention.
Figure 19:
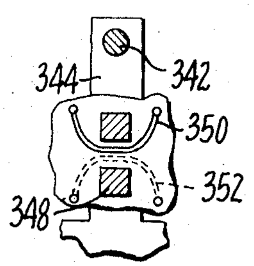
FIG. 19 is a cross-sectional view taken on the plane designated by line 19—19 of FIG. 18.

FIGS. 18 and 19 diagrammatically illustrate another alternative sensing pin arrangement which might be used in either the direct reading of embossed numerals or the reading of coded dimple-like embossments. This arrangement comprises: a pin block 338 having a passage 340 extending therethrough; a sensing pin 342 slidably received within the passage 340; a leaf spring 344 fabricated of a magnetic material and disposed to normally urge the pin 342 to the extended position illustrated in solid lines in FIG. 18; a printed circuit board 346 fixed relative to the pin block 338; a generally U-shaped magnetic core 348 fixedly mounted on the board 346 so as to have the distal ends of the bight portions thereof in contact with the spring 344; and, a pair of electrical leads 350 and 352, respectively, mounted on opposite sides of the board and extending through the core so as to form one turn coils. While not illustrated, it should be understood that the pin 342 is provided with suitable stop means to limit its extension relative to the block 338. As shown in FIG. 18, the pin is fully extended relative to the block.

In operation the arrangement of FIGS. 18 and 19 operates similarly to that described with respect to FIG. 10 insofar as depression and extension of the pins is concerned. Specifically, when an embossment is sensed, the pin extends and when a flat area on a card is sensed the pin is depressed. Depression of the pin functions to deflect the spring 344 to the phantom line position shown in FIG. 18. This in turn changes the air gap of the core 348 and this condition may be sensed through means of electrical circuitry connected to the leads 350 and 352. Similarly to the arrangement of FIGS. 16 and 17, this change is sensed as a change of inductance and reluctance. It is through this change that card reading is effected. Any suitable means might be employed to amplify the resulting change so that it may be effectively used for reading purposes.

Figure 24:
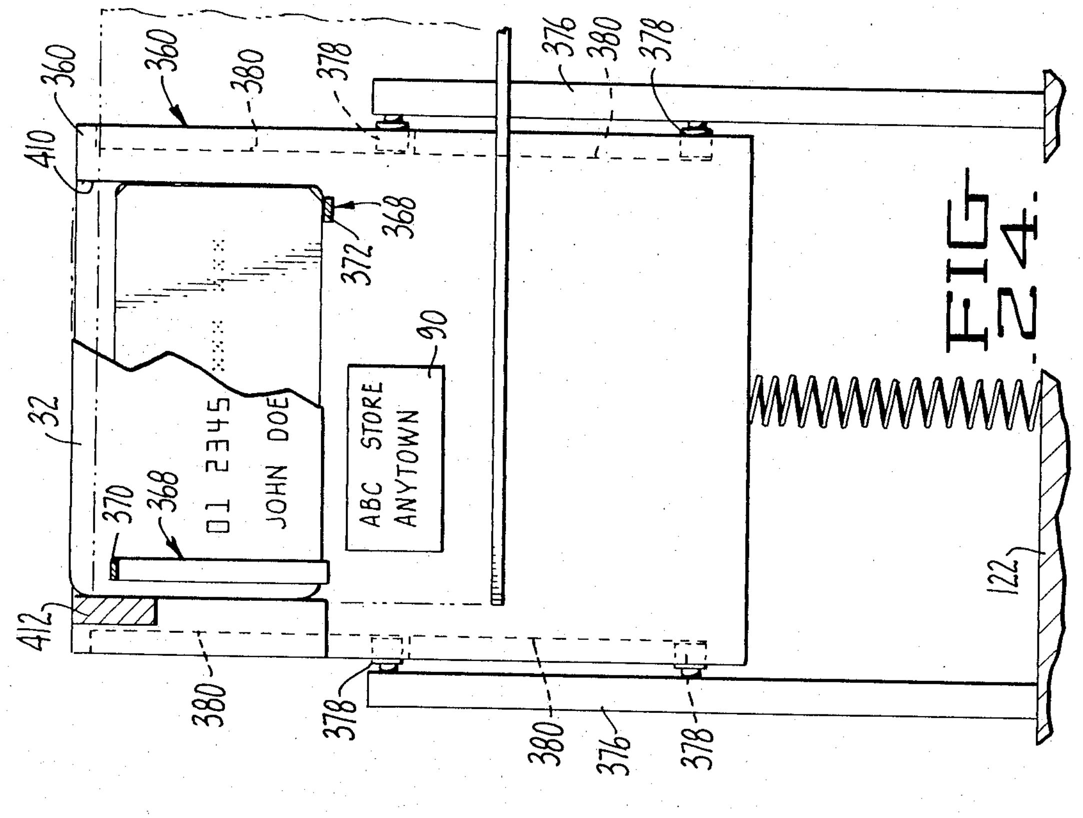
FIG. 24 is a front elevational view of the second alternative imprinting mechanism shown in FIG. 23.
Figure 23:
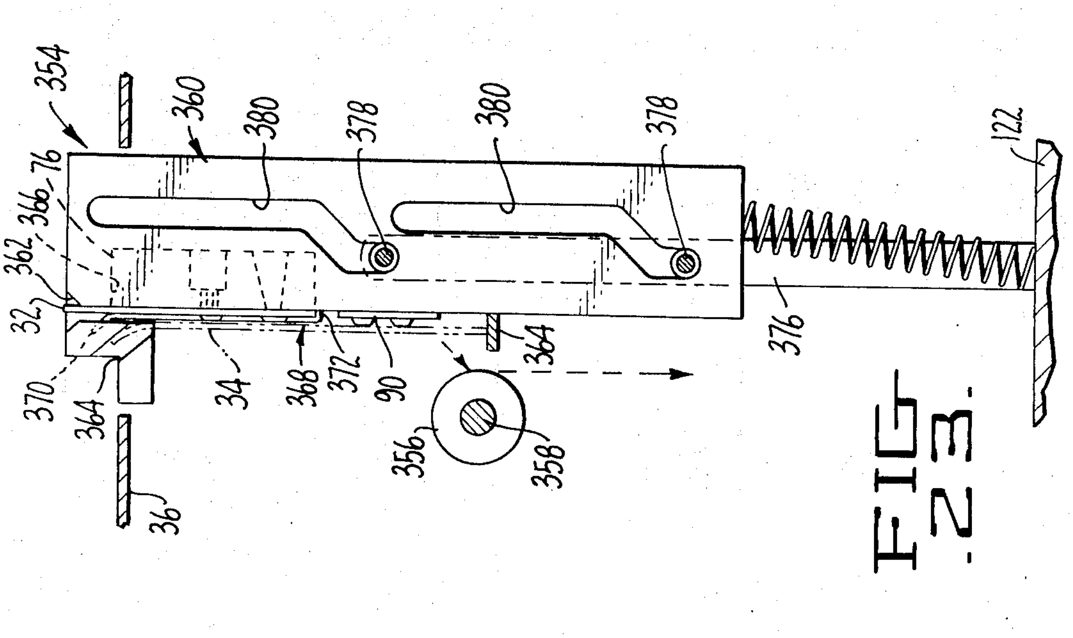
FIG. 23 is a side elevational view, with parts thereof shown in section, of a second alternative imprinting mechanism suitable for employment in the card terminal of the present invention.

FIGS. 23 and 24 illustrate an alternative form of voucher imprinting mechanism which might be used in place of that illustrated in FIGS. 1 to 7. This mechanism is designated in its entirety by the numeral 354 and differs from that previously described primarily in that it employs a single imprinting roller mounted for rotation about a fixed axis. The imprinting roller is designated by the numeral 356 and is shown rotationally supported on a fixed shaft 358. While not illustrated, it should be understood that the shaft is fixedly supported within the case of the terminal. Similarly to the embodiment of FIGS. 1 to 7, the case of the terminal shown in FIGS. 23 and 24 is designated by the numeral 36 and is shown as having a sub-frame 122 mounted therein.

The principal element of the mechanism 354 comprises a card and voucher carriage 360. The carriage is similar to the afore-described carriage 44 in that it includes a credit card receiving slot 362 and a voucher receiving slot 364. The card receiving slot 362 is disposed so as to direct a card received therein into juxtaposition with a readout pin block assembly 76 received within the carriage. The pin block assembly 76 corresponds to that described with reference to FIGS. 1 to 7 and is received within a recess 366 formed in the carriage. Spring guides 368 similar to the afore-described guides 92 are disposed to direct a card received within the slot 362 into juxtaposition with the reading surface of the pin block assembly 76. The guides 368 are of generally L-shaped configuration and include an outwardly diverging upper end 370 slidably received in the carriage in spaced relationship to the reading surface of the assembly 76 and an inwardly directed lower end 372 directed into the carriage beneath the assembly 76. The ends 372 support a card received within the slot 362, as may be seen from FIG. 24. As shown in FIGS. 23 and 24, a specimen credit card 32 is received within the slot 362.

The carriage 360 is also similar to the carriage 44 in that a merchant identification plate 90 is mounted on the carriage below the pin block assembly 76. This plate is disposed so as to imprint merchant identification on a voucher received within the slot 364 during the same operation which imprints the embossed credit card indicia of a card received within the slot 362 on the voucher. A voucher 34 is shown in phantom line representation in FIG. 23 in the position it normally assumes when received in the slot 364. From this showing it can be seen that the lower edge of the voucher is supported on a ledge 364 fixed to and extending across the carriage 360.

The carriage 360 is supported for up and down movement within the case 36 through means of a pair of posts 376 fixed to the sub-frame 122 and having roller followers 378 thereon received within cam slots 380 formed in the side surfaces of the carriage. The operation of this support can be seen from the dashed arrow line shown in FIG. 23. Specifically, when the carriage is depressed the cam operation of the roller followers 378 within the slots 380 functions to first direct the carriage vertically for a short distance, then to direct it rearwardly for a short distance to a position wherein a voucher received in the slot 364 is in engagement with the roller 356 and finally to direct the carriage vertically over a distance at least as great as the vertical expanse covered by the imprinting embossments on the merchant identification plate 90 and a credit card 32 received within the slot 362. Through this operation, depression of the carriage 360 functions through the roller 356 to imprint the embossed indicia on the merchant identification plate and a credit card onto a voucher received within the slot 364. The carriage follows a reverse path upon return to the extended position.

In normal operation, the carriage 360 would be locked in the elevated position shown in FIGS. 23 and 24 until both the verification of the card and the transaction is question were confirmed. The verification process would correspond to that described with reference to FIGS. 1 to 7. Once the card and transaction were verified, the imprint button on the terminal would light signaling that the mechanism was ready for imprinting. At this point, depression of the button would release the carriage for downward movement and imprinting of a voucher received therein. While the locking mechanism for the carriage is not illustrated, it should be understood that it might take any suitable form, such as a solenoid operated hook similar to that employed in the FIGS. 1 to 7 embodiment. As shown in FIGS. 23 and 24, a tension coil spring is fastened between the carriage and the sub-frame 122 to normally bias the carriage downwardly. The operation of the spring might be supplemented by any suitable operating mechanism to impart positive downward and upward movement to the carriage. This mechanism would function to return the carriage to the elevated condition after imprinting of the voucher was completed.

Figure 21:
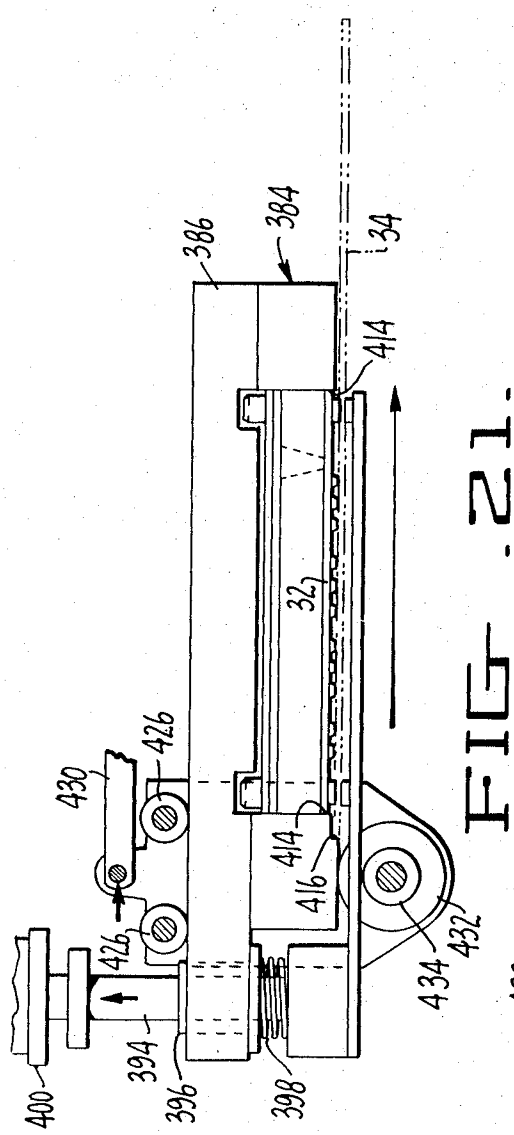
FIGS. 21 and 22 are cross-sectional views taken on the planes designated by lines 21—21 and 22—22, respectively, of FIG. 20.
Figure 22:
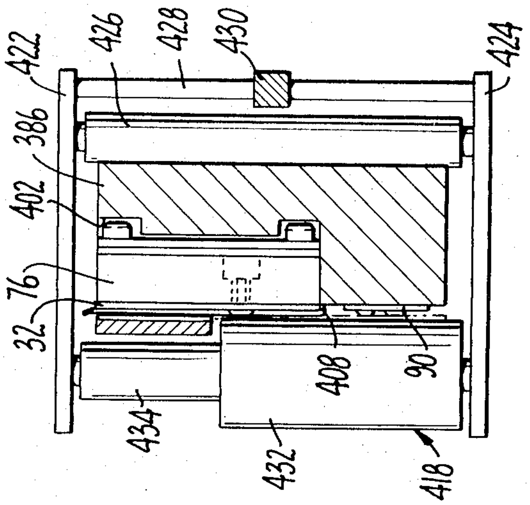
Figure 20:
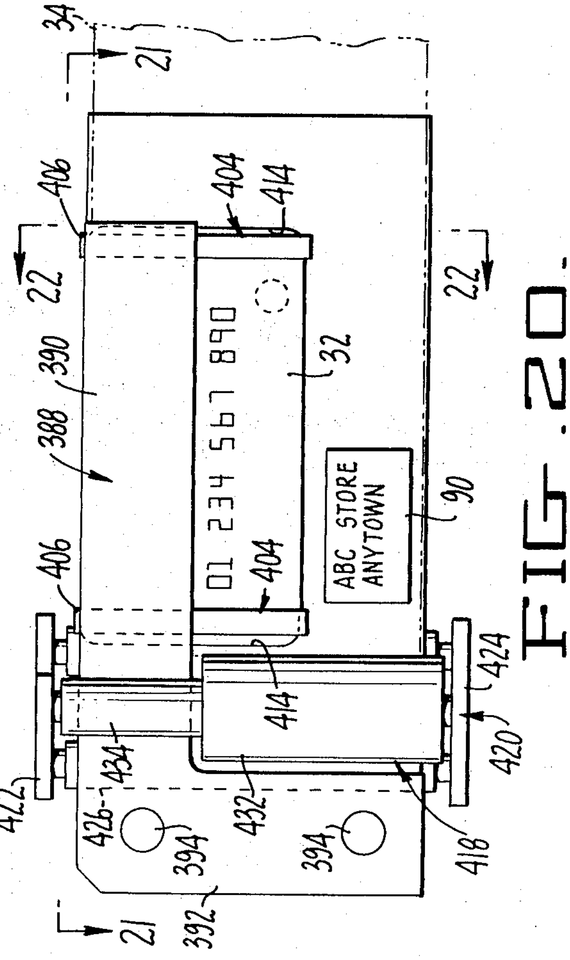
FIG. 20 is an elevational view of a first alternative imprinting mechanism suitable for use in the card terminal of the present invention.

FIGS. 20, 21 and 22 illustrate yet another voucher imprinting mechanism suitable for employment in the terminal 30. This mechanism is designated in its entirety by the numeral 384 and comprises, as its principal element, a stationary card and voucher carriage 386. While not illustrated, it should be understood that this carriage is mounted in the case 36 through any suitable means, such as mounting posts on the sub-frame 122. The carriage 386 is referred to as being "stationary" because it is not necessary that the carriage be translated to effect the imprinting operation. It is possible, however, to mount the entire mechanism 384 for movement as a unit if so desired. For example, the mechanism might be mounted on resilient shock mountings.

The carriage 386 supports a clamping mechanism comprising: a plate 388 of generally L-shaped configuration having horizontal and vertical arms 390 and 392, respectively; a pair of guide pins 394 fixed to the arm 392 and extending therefrom slidably through sleeve bearings 396 mounted in the carriage 386; compression coil spring 398 (only one of which is illustrated) received around the pins 394 in interposed relationship between the carriage 386 and plate 388 to normally bias the plate outwardly relative to the carriage; and, a solenoid 400 mounted on the carriage and having the operating rod thereof coupled to the uppermost pin 390 so that activation of the solenoid functions to retract the pins relative to the carriage against the action of the springs 98. While not illustrated, it should be understood that the solenoid may be mounted on the carriage through any suitable mounting structure.

Carriage 386 is formed with a recess 402 in which a pin block assembly 76 is mounted. This assembly corresponds identically in structure and mode of operation to the pin block assembly of FIGS. 1 to 7. It is mounted so as to have the reading surface thereof flush with the surface of the carriage for the reading of a credit card received by the carriage. The carriage 386 also supports an embossed merchant identification plate 90 corresponding to the plate 90 shown in FIGS. 1 to 7. This plate is disposed below the pin block assembly 76 so that the information of the plate is imprinted on a voucher simultaneously with the imprinting of credit card information thereon.

Spring guides 404 similar to the afore-described guides 368 are mounted on the carriage 386 so as to extend upwardly across the pin block assembly 76 received therein to support a credit card in juxtaposition to the assembly. The guides 404 are of generally L-shaped configuration and include free upwardly disposed distal ends 406 and inwardly directed lower ends 408 secured in the carriage 386 beneath the pin block assembly. Thus, the guides 404 provide a card receiving slot adapted to support a credit card in juxtaposition to the pin block assembly 76 received within the carriage 386. In FIGS. 20, 21 and 22 a ard 32 card shown supported on the guides.

While not illustrated, it should be understood that any suitable means might be provided for centering a credit card received on the guides 404 relative to the pin block assembly 76. This might take a form similar to the centering arrangement illustrated in FIG. 24. The latter arrangement comprises an abutment edge 410 supported on the carriage 360 for sliding engagement with one of the vertical edges of a card received therein and a spring biased guide block 412 carried by the carriage for slidable engagement with the other vertical edge of the card. The support structure for the guide block 412 might correspond substantially to that of the block 112 illustrated in the FIGS. 1 to 7 embodiment. The vertical edges of the card receiving slot in the embodiment of FIGS. 20, 21 and 22 are designated by the numeral 414.

The plate 388 and the surface of the carriage 386 opposed thereto define a voucher receiving slot. A voucher, designated 34 is shown received in this slot in FIGS. 20 and 21. A vertical edge 416 formed on the carriage provides a guide for one of the vertical edges of a voucher received within the slot. While not illustrated, it should be understood that any suitable means might be employed to support the lower edge of the voucher. This might take the form of a ledge similar to the ledge 364 on the carriage of the FIGS. 23 and 24 embodiments.

The imprinter roller of the FIGS. 20 to 22 embodiment is designated by the numeral 418 and is carried on intermediate support carriage for selective movement back and forth across the carriage 386. The intermediate support carriage is designated in its entirety by the numeral 420 and comprises: upper and lower plates 422 and 424 rotationally supporting the roller 418 therebetween to the front side of the carriage 386; follower roller 426 rotationally supported between the plates 422 and 424 for rolling engagement with the rear surface of the carriage 386; a rod 428 secured between the plates 422 and 424 to the rear of the roller 426; and, an operating link 430 secured to the rod 428 intermediate the ends thereof. While not illustrated, it should be understood that any suitable mechanism might be attached to the link 430 to impart pushing and pulling movement thereto for purposes of traversing the intermediate support carriage 420 back and forth across the carriage 386.

The imprinter roller 418 is formed with a lower section 432 of enlarged diameter and an upper section 434 of reduced diameter. The section 432 is proportioned for rolling engagement with the front surface of the carriage 386 and a voucher disposed thereover so that traversal of the carriage 420 across the carriage 386 functions to imprint the embossed indicia of the merchant identification plate 90 and a credit card 32 supported on the carriage 386 onto the voucher. The section 434 is proportioned so as to permit the plate 388 to move outwardly relative to the carriage 386 by a distance sufficient to enable a voucher to be easily inserted between the plate and a credit card received in the carriage. If desired, the section 434 may be employed to limit outward movement of the plate. Alternatively, other suitable stop means might be provided on the guide pins 394 to limit outward movement of the plate.

In normal operation the imprinting mechanism 384 is conditioned as illustrated in FIGS. 20 and 21 at the outset of terminal operation. In this condition the plate 388 is released for extension by the springs 398 and the intermediate support carriage is disposed to the far left-hand side of the carriage 386 in a position removed from the area of the card and voucher receiving slots. Thus, a card and voucher may be freely inserted into the respective slots. While not illustrated, it should be understood that the case may be provided with suitable guide slots aligned with the card and voucher receiving slots of the mechanism 384 to direct a card and a voucher into the respective slot-like area provided therefor in the mechanism.

Once a card and voucher are positioned in the mechanism 384 the terminal operates in much the same manner as the terminal described with respect to FIGS. 1 to 7. Specifically, the card is first checked for verification through the photoelectric sensing device and, assuming the verification of the card is confirmed, the transmit light of the terminal is activated. At this point, depression of the transmit button functions to activate the solenoid 400 to force the plate 388 downwardly and, thus, forces the credit card received within the mechanism to secure it against the pin block mechanism. Simultaneously with or immediately after the latter operation the terminal transmits to the central computer for verification of the transaction. Assuming the verification of the transaction is confirmed, the print button of the terminal is activated to indicate that the imprinter is in condition for printing. At this point, depression of the print button functions to activate the traversing mechanism connected to the link 430 to traverse the intermediate support carriage back and forth across the carriage 386. As described above, this operation functions to imprint the embossed indicia of the credit card and the merchant identification plate onto the voucher.

At the end of the preceding operation the transaction is complete and the mechanism 384 is again in condition for a new transaction. This means that the solenoid 400 is deactivated to release the plate 388 and that the card and voucher are removed from the mechanism. While not illustrated, it should be understood that any suitable ejecting mechanism might be provided to facilitate removal of the card and voucher.

From the foregoing detailed description, it is believed apparent that the present invention enables the attainment of the advantages initially set forth herein. It should be understood, however, that the invention is not intended to be limited to the specifics of the embodiments herein illustrated and described, but rather is defined by the following claims.

We claim:

1. In an assembly for reading indentations in the surface of a card defining embossed Arabic numerals laid out on an imaginary superimposed "H"-shaped configuration, the improvement comprising:

a. a block adapted to be disposed in opposed facing relationship to the surface of the card, said block having a plurality of passages extending therethrough and positioned, respectively, so as to be in opposed aligned relationship to the indentations of the card, said passages being arranged in groups of five with each group being of "X"-shaped configuration having one passage at the end of each leg of the "L" and one passage at the intersection of the legs of the "X" whereby, when one of said groups is disposed in opposed aligned relationship to one of said embossed Arabic numerals, the passages will be aligned with predetermined areas of interest of the superimposed "H"-shaped configuration of the numeral;

b. a plurality of pins slidably extending, respectively, through the passages in said block, said pins each having one end thereof disposed to extend from one side of the block and into engagement with the surface of the card and an opposite end disposed to extend from an opposite side of the block; and, c. a leaf spring secured so as to be in apposition to said opposite side of the block when the block is in opposition to the surface of the card, said leaf spring being planar and having a plurality of vanes, each of which is disposed for engagement with one of the pins to normally bias the pin into engagement with the surface of the card, said vanes being arranged in groups of five to cooperate with each group of five passages arranged in an "X"-shaped configuration so that only one vane extends over each passage and the vanes disposed to bias the pins in the passages at the end of each of the legs of the "X" extend toward one another from generally opposite directions to define closely spaced ends positioned to individually bias the pins disposed in the passages at the ends of the legs of the "X".

2. The improvement according to claim 1 wherein the vanes of the spring are formed with free distal ends and the distal ends of the vanes in each of said groups of five are arranged in an "X"-shaped configuration corresponding to the "X"-shaped configuration in which the group of passages cooperating therewith is arranged.

3. The improvement according to claim 1 wherein said spring is fabricated of electrically conductive material and forms a segment of an electrical circuit, and further comprising:

a. first electrical contact means disposed to one side of said spring in electrically insulated relationship thereto; and b. second electrical contact means secured to said respective vanes, said second means being deflectable into and out of electrical contact with said first means upon movement of said vanes responsive to slidable movement of the pins within the passages.

* * * * *